United States Patent
Sang et al.

(10) Patent No.: US 11,973,690 B2
(45) Date of Patent: Apr. 30, 2024

(54) APPLICATION PRECEDENCE BASED TRAFFIC POLICY ENFORCEMENT

(71) Applicant: Palo Alto Networks, Inc., Santa Clara, CA (US)

(72) Inventors: Daphne Sang, Los Altos, CA (US); Harish Patil, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/937,792

(22) Filed: Oct. 4, 2022

(65) Prior Publication Data

US 2024/0113979 A1    Apr. 4, 2024

(51) Int. Cl.
*H04L 47/2425* (2022.01)
*H04L 47/2475* (2022.01)
*H04L 47/2483* (2022.01)

(52) U.S. Cl.
CPC ...... *H04L 47/2433* (2013.01); *H04L 47/2475* (2013.01); *H04L 47/2483* (2013.01)

(58) Field of Classification Search
CPC ............. H04L 47/2433; H04L 47/2475; H04L 47/2483
See application file for complete search history.

(56) References Cited

U.S. PATENT DOCUMENTS

| | | | | |
|---|---|---|---|---|
| 10,374,870 B2 * | 8/2019 | Klaedtke | ................. | H04L 69/22 |
| 10,454,877 B2 * | 10/2019 | Fernando | ................ | H04L 41/40 |
| 10,873,533 B1 * | 12/2020 | Ismailsheriff | ........... | H04L 47/29 |
| 10,979,316 B2 * | 4/2021 | Pasupathy | ............ | H04L 47/2425 |
| 11,005,729 B2 * | 5/2021 | Jain | ......................... | H04L 43/14 |
| 11,233,715 B1 * | 1/2022 | Kumar | ................ | H04L 47/2441 |
| 11,381,474 B1 * | 7/2022 | Kumar | ................ | H04L 41/0896 |
| 11,516,139 B2 * | 11/2022 | Ismailsheriff | ....... | H04L 47/2441 |
| 11,553,371 B2 * | 1/2023 | Dhammawat | ..... | H04W 28/0268 |
| 11,641,598 B2 * | 5/2023 | Cheng | ................ | H04W 28/0268 370/329 |
| 2014/0064080 A1 * | 3/2014 | Stevens | ............... | H04L 47/2441 370/235 |
| 2021/0184983 A1 * | 6/2021 | Ramaswamy | .......... | H04L 47/36 |
| 2022/0141148 A1 * | 5/2022 | Patil | .................... | H04L 47/6275 370/230.1 |
| 2023/0283529 A1 * | 9/2023 | Zhang | .................. | H04L 41/147 370/235 |

* cited by examiner

*Primary Examiner* — George C Neurauter, Jr.
(74) *Attorney, Agent, or Firm* — Gilliam IP PLLC

(57) ABSTRACT

Assigning priority values to applications in advance facilitates later precedence ordering of the application identifiers when processing network traffic. The priority values can be assigned according to defined rules that satisfy a paradigm for application precedence in policy enforcement. When multiple application identifiers are determined from inspecting network traffic of a flow, a control plane process retrieves the assigned priority values and sorts the application identifiers according to the priority values. The control plane then communicates the sorted list of application identifiers to the data plane. The data plane enforces policies set for the applications identified in the list of application identifiers on the corresponding network traffic flow according to the order of precedence conveyed by the sorted list. This allows flexible and accurate policy enforcement on network traffic.

20 Claims, 4 Drawing Sheets

APPLICATION PRECEDENCE BASED TRAFFIC POLICY ENFORCEMENT

BACKGROUND

The disclosure generally relates to electronic communication (e.g., CPC Class H04 and digital transmission arrangements for network maintenance, administration, or management (e.g., subclass H04L 41/00).

Flow tracking inspects information in headers of packets (i.e., transport layer protocol data units) to classify packets of network traffic into different flows. A flow is identified with a tuple, which may be a 5- or 3-tuple. A 5-tuple for flow classification includes source Internet Protocol (IP) address, source Transmission Control Protocol (TCP)/User Datagram Protocol (UDP) port, destination IP address, destination TCP/UDP port, and IP protocol. A 3-tuple for flow classification would include source IP address, destination IP address, and IP protocol. After flow classification, a firewall can use stateful inspection to identify the application of a flow based on port and source/destination addresses. A firewall may also use deep packet inspection to identify an application based on an application signature/pattern in application data.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

Identification of a web application ("application") from inspecting network traffic of a flow can vary in accuracy. For example, the same application can be identified with multiple application identifiers: "tls" (an application that uses the transport layer security (TLS) protocol), "websocket" (an application that uses a websocket), and "conferenceXapp" (a specific application named conference X). Different policies may be set for these application identifiers.

Assigning priority scores/values to applications (via application identifiers) in advance facilitates later precedence ordering of the application identifiers when processing network traffic. The priority values can be assigned according to defined rules that satisfy a desired paradigm for application precedence in policy enforcement. As an example, a rule can be defined that specifies identifiers of customer/user-created custom applications be assigned higher priority (e.g., lower priority scores assuming an inverse relationship between priority and priority score) than identifiers of system applications. When multiple application identifiers are determined from inspecting network traffic of a flow, a control plane process retrieves the assigned priority values and sorts the application identifiers according to the priority values. The control plane then communicates the sorted list of application identifiers to the data plane. The data plane enforces policies set for the applications identified in the list of application identifiers on the corresponding network traffic flow according to the order of precedence conveyed by the sorted list. This allows flexible and accurate policy enforcement on network traffic.

Example Illustrations

Figure 1:
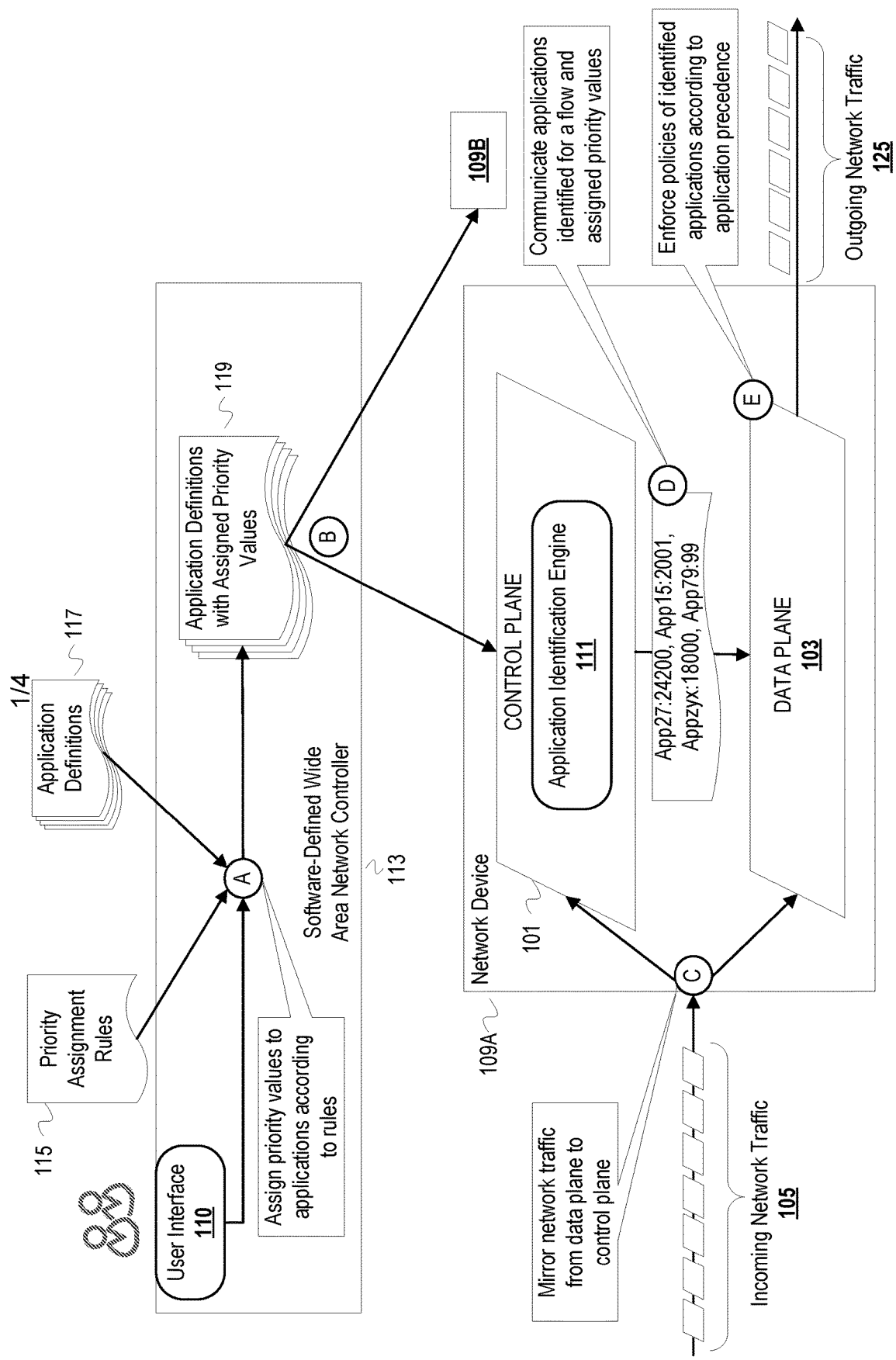
FIG. 1 depicts a system that enforces policies on network traffic based on application precedence as indicated by assigned priority values.

FIG. 1 depicts a system that enforces policies on network traffic based on application precedence as indicated by assigned priority values. The system includes a software-defined wide area network (SD-WAN) controller 113 that communicates with multiple network devices. While a SD-WAN controller 113 can communicate with numerous network devices, FIG. 1 illustrates only 2 network devices 109A-109B. In this illustration, the SD-WAN controller 113 receives or has access to rules 115 for assigning priority values to applications ("priority assignment rules") and application definitions 117. Application definitions 117 at least include an application identifier and signature(s) for identifying the application. Either of the priority assignment rules 115 and the application definitions 117 can be configured via the user interface 110 and/or elsewhere.

Below is an example of a set of priority assignment rules. These can be set as default and then configured for customer preference/experience. Priority is represented with a value/score.

Rule-1: Child/tunnel application priority scores<parent/container application priority scores Rule-2: User-created custom application priority scores<system application priority scores Rule-3: Layer 7 (L7) protocol-based application priority scores<coarse grain application-id application priority scores Rule-4: L7 content-based applications priority score<fine grain application-id based applications priority score Rule-5: Port-based applications priority score should be greater than all other application priority scores The different classes of applications are configurable and are provided as a helpful illustration. The above examples refer to classes that may not be considered self-explanatory: a L7 protocol-based application, a coarse grain application-id application, a L7 content-based application, and a fine grain application-id application. A "L7 protocol-based application" refers to an application identified based on signature of a L7 protocol (e.g., hypertext transfer protocol (HTTP), file transfer protocol (FTP), session initiation protocol (SIP), real-time transfer protocol (RTP), RTP control protocol (RTCP)). A "coarse grain application-id based application" refers to an application identified based on a signature more specific than a protocol but at a coarser granularity than a specific application (e.g., web-browsing application, secure sockets layer (SSL) application). A "L7 content-based application" refers to an application identified based on a L7 content-specific signature that can be used to distinguish the application at a more granular level than the coarse grain application identification. For example, a signature for a L7 content-specific signature can be used to identify an application of a same platform and/or web programming interface as other application but for a particular application, such as uploading a document or downloading an application. A "fine grain application-id application" refers to an application identified based on a signature of a SD-WAN known application (e.g., a specific customer defined layer 7 (L7) application, a specific SD-WAN application). A range of scores can be divided among the different classes or groups of applications, which is also configurable for customer preference. Below is an example with specific ranges of scores according to the above example rules.

(1) SD-WAN Layer 4 (L4) custom applications: 1-999 (default=999)
(2) SD-WAN L7 custom applications: 1000-1999 (default=1999)
(3) SD-WAN prefix-based applications: 2000-2999 (default=2999)
(4) threat-signature-based applications: 3000-17999 ((default==17999)
(5) container/parent applications: 18000-18999 (default=18999)
(6) L7 protocol-based applications: 19000-23999 (default=23999)
(7) fine grain application-id-based applications: 24000-24299 (default=24299)
(8) port-based applications: 24300-24999 (default=24999)
(9) SD-WAN port-based applications: 25000-25299 (default=25299)

Another variation on the above example includes applications identified based on layer 3 and/or 4 (L3/4) protocol signatures. The L3/4 class of identified applications could be prioritized prior to the fine grain application-id-based applications with the score ranges adjusted to accommodate.

FIG. 1 is annotated with a series of letters A-E. Each stage represents one or more operations. Although these stages are ordered for this example, the stages illustrate one example to aid in understanding this disclosure and should not be used to limit the claims. Subject matter falling within the scope of the claims can vary from what is illustrated. The example illustration only refers to operations occurring on the network device 109A.

At stage A, priority values are assigned to applications according to rules. For instance, a user can assign priority values to applications via the user interface 110. The user interface 110 or associated program code can evaluate priority assignments against the rules and/or constrain options presented via the user interface 110 according to the rules 115. The assignment updates the applications definitions 117 to generate application definitions with assigned priority values 119. Files or data structures with entries or records for each application can update the definition to associate an application identifier with an assigned priority value. At least some of the assignment can be automated by evaluating the application definitions against the assignment rules 115. The definitions can indicate classes or types of applications which program code can use to automatically assign priority values to applications defined in the application definitions 117. A configuration file can also be parsed to initially assign priority values and/or validate assigned priority values.

At stage B, the SD-WAN controller 113 communicates the application definitions with assigned priority values 119 to the network devices 109A-109B. This can be done periodically and triggered by updates to the rules 115, the application definitions 117, and/or the application definitions with priority value assignments 119. While not illustrated, the application definitions 117 are also distributed to network devices 109A-109B.

At stage C, the network device 109A mirrors incoming network traffic 105 received at a data plane 103 to a control plane 101. The data plane 103 can process network traffic before receiving application definitions with priority value assignments 119.

At stage D, the control plane 101 communicates applications identified for a flow of the incoming network traffic 105 and priority values assigned to the identified applications to the data plane 103. An application identification engine 111 in the control plane 101 scans network traffic to identify applications based on signatures.

At stage E, the data plane 103 enforces policies of the identified applications according to application precedence. Application precedence is relative among the identified applications of a flow based on the priority values assigned thereto.

Figure 2:
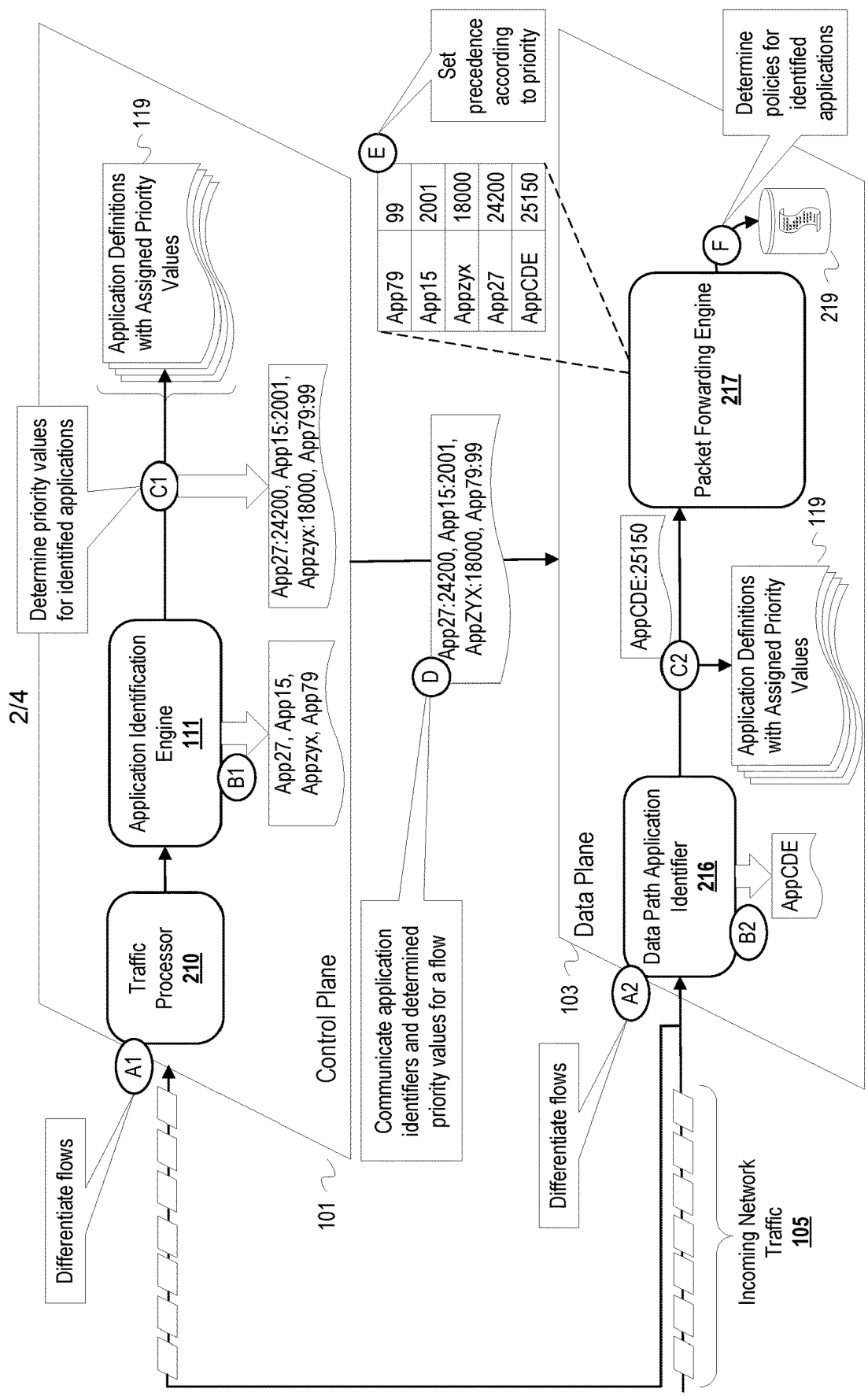
FIG. 2 depicts a conceptual diagram that elaborates on the operations in the control plane and data plane for determining application precedence for policy enforcement.

FIG. 2 depicts a conceptual diagram that elaborates on the operations in the control plane and data plane for determining application precedence for policy enforcement. FIG. 2 illustrates the control plane 101 and the data plane 103 of FIG. 1. In FIG. 2, the application definitions with priority value assignments 119 have been loaded in both the control plane 101 and the data plane 103. The application definitions with priority value assignments 119 is loaded into the data plane 103 since the data plane 103, in this example illustration, includes a data path application identifier 216.

FIG. 2 is annotated with a series of letters A-F, including B1, B2, C1, and C2. Each stage represents one or more operations. Although these stages are ordered for this example, the stages illustrate one example to aid in understanding this disclosure and should not be used to limit the claims. The example operation represented by stages A1-C2 and D can overlap/parallel the operations represented by stages A2-C2. Subject matter falling within the scope of the claims can vary from what is illustrated.

At stages A1 and A2, incoming network traffic 105 is differentiated into flows. FIG. 2 depicts a traffic processor 210 differentiating flows in the incoming network traffic 105 mirrored to the control plane 101. The data plane 103 also includes a traffic processor(s) to differentiate network traffic into flows, although not illustrated due to space constraints. The differentiation will yield a flow identifier for each flow.

At stages B1 and B2, applications are identified in a network traffic flow. For stage B1, the application identification engine 111 scans the network traffic flow for signatures to identify applications. The scanning can be staged or modularized to scan network traffic flows for different application signatures, which can result in different applications being identified in a same flow. For stage B2, the data path application identifier 216 scans the network traffic flow for a signature. The application identification engine 111 detects applications identified as App27, App15, Appzyx, and App79 in a flow. The data path application identifier 216 detects an application identified as AppCDE in the flow.

At stages C1 and C2, priority values assigned to the identified applications are determined with the application definitions with priority assignments 219. In the control plane 101, the application identification engine 101 retrieves the priority values assigned to the applications App27, App15, Appzyx, and App79. In the data plane 103, the data path application identifier 216 retrieves the priority value assigned to AppCDE. Retrieving an assigned priority can vary depending upon implementation of the application definitions with priority value assignments 119. To illustrate, retrieval may be a table or file lookup if a file or table is used. If the application definitions with priority value assignments 119 is implemented as a database, retrieval can be a query with the application identifier. After being determined, the assigned priority values are associated with the application identifiers. The association of application identifiers and assigned priority values can be implemented as an in-memory structure (e.g., table or map), external data source (e.g., file, database, data source accessible via a representational state transfer (REST) API), etc. For the applications detected in the flow in the control plane 101, the associations are: App27:24200, App15:2001, Appzyx:18000, App79:99. For the application AppCDE detected in the data plane 103, the association is AppCDE:25150.

At stage D, the control plane 101 communicates the associations of applications identified in the control plane and assigned priority values to the data plane 103. This can be over an interplane interface with a process to process communication, a direct memory write, through a shared memory, etc.

At stage E, a packet forwarding engine 217 sets application precedence among the applications identified for the flow based on the assigned priority values. In this illustration, the greatest precedence corresponds to the highest priority which is indicated by a lowest priority value. For the applications identified in the flow, the lowest priority value is 99 which is associated with the application identifier App79. Thus, the application App79 has greatest precedence among the identified applications and AppCDE with a priority value of 25150 has least precedence among the applications identified for the flow.

At stage F, the packet forwarding engine 217 determines the policies for the identified applications. The packet forwarding engine 217 uses the application identifiers to access a store or repository of policies 219 to determine the policies defined or configured for the identified applications. Since the application App79 has greatest precedence for the flow, the corresponding policy(ies) will be enforced before any other.

Figure 3:
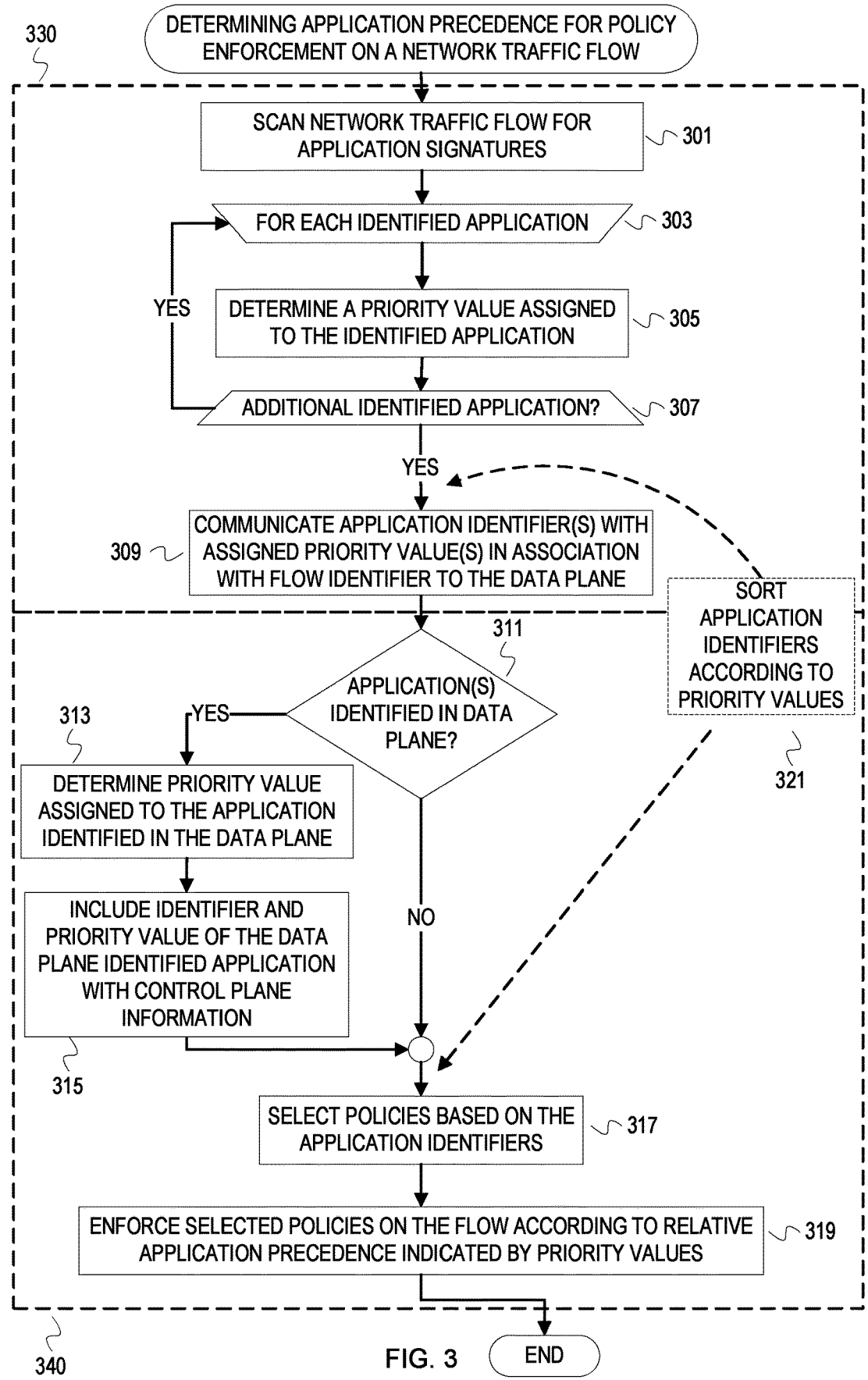
FIG. 3 is a flowchart of example operations for determining application precedence for policy enforcement on a network traffic flow.

FIG. 3 is a flowchart of example operations for determining application precedence for policy enforcement on a network traffic flow. Description of the example operations refers to a control plane and a data plane since the operations are divided between the two planes. The example operations performed in the control plane are within a dashed rectangle 330. The example operations performed in the data plane are within a dashed rectangle 340. The example operations of FIG. 3 presume application definitions with priority assignments have already been installed or loaded into the control and data planes.

At block 301, a control plane scans a network traffic flow for application signatures. Likely, the control plane scans multiple flows of network traffic. The description only refers to a single flow to avoid complicating the description.

At block 303, the control plane selects an application identifier for each application identified from the scanning. As a result of the scanning, the control plane may have created a list (e.g., array) of application identifiers.

At block 305, the control plane determines a priority value assigned to the application identified by the application identifier. For example, the control plane may query a database of application definitions with the application identifier for the priority value indicated in an entry or record obtained from the query.

At block 307, the control plane determines whether there is another identified application for which a priority value is to be determined. If there is another application that was identified, then operational flow returns to block 303. Otherwise, operational flow proceeds to block 309.

At block 321, the control plane sorts the application identifiers according to the assigned priority values. This sorting reflects the relative application precedence according to the priority values. Block 321 is depicted in a dashed block because sorting of the identifiers is optional. FIG. 3 depicts block 321 with multiple arrows directed to a location between blocks 307, 309 and a location preceding block 317 to indicate the optional, operational locations for sorting. If sorting is implemented, then it could be performed in the control plane and data plane since the data plane may have detected an application also. Other implementations may delay sorting until all applications have been identified from both planes, which would be prior to block 317 in this example illustration.

At block 309, the control plane communicates the application identifiers with the assigned priority values that were determined to the data plane. Since the data plane and control plane observe multiple network traffic flows, the control plane communicates the application identifiers and priority values in association with a corresponding flow identifier.

At block 311, the data plane determines whether an application was identified in the data plane. If the data plane has identified an application in the flow identified by the flow identifier communicated from the control plane, then operational flow proceeds to block 313. If the data plane did not identify any applications for the identified flow, then operational flow proceeds to block 321 (if performed) or 317 if 321 is not performed. The data plane may determine whether any of the data plane application identifications is/are redundant with the control plane identification. If so, then operational flow would proceed to block 321 if all of the data plane identifications are redundant. In some cases, the data plane may filter out redundant data plane application identifiers.

At block 313, the data plane determines a priority value assigned to the application identifier determined in the data plane. For simplicity, these example operations presume a single application was identified in the data plane. The data plane would access the application definitions that include priority value assignments. As in the control plane, the data plane may submit a database query or table lookup with the application identifier.

At block 315, the data plane includes the application identifier determined in the data plane and assigned priority value with the control plane information. If the control plane information is already sorted, then the data plane can perform an insert that preserves the ordering of application identifiers by priority values.

At block 317, the data plane selects policies based on the application identifiers. The data plane can access a repository of policies, which is likely loaded into a memory of the data plane. Policies will have been configured for different applications. A same policy may be configured to multiple of the identified applications. The data plane can indicate or reference the selected policies from corresponding ones of the application identifiers.

At block 319, the data plane enforces the selected policies on the network traffic flow according to relative application precedence among the identified applications. If the application identifiers were not sorted to reflect application precedence, then the priority values are relied upon. To enforce the selected policies according to application precedence, the precedence carries over to the policies. For example, the data plane will enforce the policy configured for the application with highest precedence and non-conflicting provisions of a different policy configured for an identified application with the next highest precedence. The data plane may be configured to dynamically create a policy for the network traffic flow from the selected policies by preempting conflicting provisions of policies of lower precedence applications.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
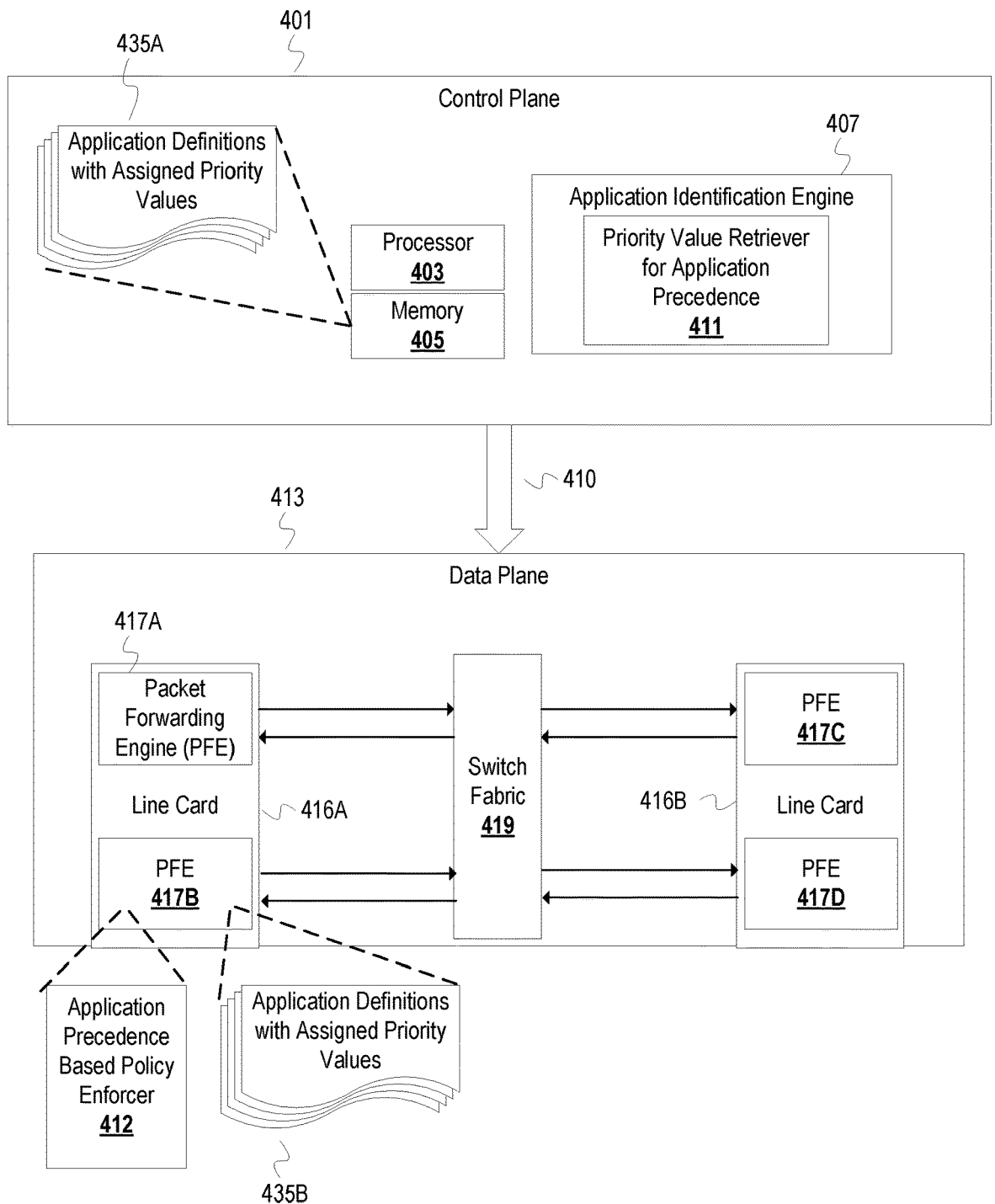
FIG. 4 depicts an example computer system with a data plane and a control plane that includes program code for application precedence based policy enforcement.

FIG. 4 depicts an example computer system with a data plane and a control plane that includes program code for application precedence based policy enforcement. The computer system includes a control plane 401 and a data plane 413. The control plane 401 includes a processor 403 (possibly including multiple processors, multiple cores, multiple nodes, and/or implementing multi-threading, etc.) and memory 405. The memory 405 may be system memory or any one or more of the above already described possible realizations of machine-readable media. The control plane 401 also includes an application identification engine 407 which includes a priority value retriever 411 for application precedence. The processor 403 may implement the application identification engine 411 (e.g., execute instructions of the program code). The application identification engine 407 may be an application specific integrated circuit that is coupled with the processor 403 but distinct from the processor 403. The memory 405 (or another memory of the control plane 401) has loaded thereon application definitions 435A with assigned priority values. A communication channel 410 communicatively couples the control plane 401 to the data plane 413. The data plane 413 includes line cards 416A, 416B which communicate via a switch fabric 419. The line card 416A includes packet forwarding engines (PFEs) 417A, 417B. The line card 416B includes PFEs 417C, 417D. At least the PFE 417B includes an application precedence based policy enforcer 412 and has loaded thereon application definitions 435B with assigned priority values. The application identification engine 407 differentiates network traffic mirrored from at least one of the PFEs 417A-417D and scans the differentiated flows to identify applications. For flow with multiple applications identified, the priority value retriever 411 accesses the application definitions 435A to determine priority values assigned to the identified applications. For each flow with multiple identified applications, the control plane 401 communicates the application identifiers and assigned priority values in association with a flow identifier to the data plane 413. As mentioned earlier, each of the PFEs 417A-417D may also inspect flows for application signatures to identify applications. Assuming the network traffic flow corresponding to the multiple applications identified in the control plane 401 is traversing the PFE 417B, the enforcer 412 will determine priority values assigned to an applications identified in the flow by the PFE 417B with the application definitions 435B and incorporate into the listing of identified applications from the control plane 401. After determining the policies configured for the identified applications, the enforcer 412 will enforce the policies according to precedence as indicated by the priority values.

Embodiments are not limited to deployment in a network device with line cards as depicted in FIG. 4. Embodiments may be deployed as a virtual firewall or cloud-based firewall, for example.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:
1. A method comprising:
for each of a plurality of applications identified in a flow of network traffic in a control plane, determine a previously assigned priority value;

communicating identifiers of the plurality of applications and the determined priority values to a data plane;

in the data plane, selecting policies to enforce on network traffic corresponding to the flow based, at least in part, on the identifiers of the plurality of applications; and in the data plane, enforcing the selected policies on network traffic corresponding to the flow according to precedence of the plurality of applications based, at least in part, on the priority values.

2. The method of claim 1 further comprising ordering the identifiers of the plurality of applications according to the priority values, wherein communicating the identifiers comprises communicating the identifiers with the ordering.

3. The method of claim 1 further comprising communicating the assigned priority values in association with the identifiers of the plurality of applications from the control plane to the data plane.

4. The method of claim 1 further comprising:
in the data plane,
identifying an additional application in the flow; and
determining a priority value assigned to the additional application,
wherein selecting the policies to enforce on network traffic corresponding to the flow is also based on an identifier of the additional application,
wherein precedence of the plurality of applications is also with respect to the priority value assigned to the additional application.

5. The method of claim 1, wherein the previously assigned priority values were previously assigned according to a set of rules that specify relative priority assignments for application precedence.

6. The method of claim 5, wherein the set of rules specify at least one of: a child application being assigned a higher priority than a parent application, a tunnel application being assigned a higher priority than a container application, a custom application being assigned a higher priority than a system application, a layer 7 protocol based application being assigned a higher priority than an application identified by an application specific signature, and an application identified by port being assigned a lower priority than applications identified by other than port.

7. The method of claim 1 further comprising inspecting the network traffic of the flow to detect applications and detecting the plurality of applications, wherein the flow of network traffic is mirrored from the data plane to the control plane.

8. The method of claim 1 further comprising receiving, in the control plane, definitions of applications that include application identifiers and assignments of priority values to the application identifiers, wherein retrieving the previously assigned priority values comprises retrieving the previously assigned priority values from the assignments of priority values to the application identifiers.

9. A non-transitory, machine-readable medium having program code stored thereon, the program code comprising instructions to:

in a control plane, inspect a first flow of network traffic to identify applications indicated in the network traffic;

for each of a plurality of applications identified based on inspection, determine one of a plurality of priority values previously assigned to the identified application;

in a data plane, select policies based, at least in part, on identifiers of the plurality of applications; and in the data plane, enforce the selected policies on network traffic corresponding to the flow according to precedence as represented by the determined priority values.

10. The non-transitory, machine-readable medium of claim 9, wherein the program code further comprises instructions to order identifiers of the plurality of applications according to the priority values, wherein the precedence is indicated by the ordering.

11. The non-transitory, machine-readable medium of claim 10, wherein the program code further comprises instructions to:
in the data plane,
inspect the flow for application identification; and
based on identification of an additional application, determine a priority value previously assigned to the additional application; and
order the identifiers of the plurality of applications and the additional application based on the assigned priority values,
wherein the flow of network traffic is mirrored from the data plane to the control plane.

12. The non-transitory, machine-readable medium of claim 9, wherein the program code further comprises instructions to communicate one of: identifiers of the plurality of applications in order according to the priority values from the control plane to the data plane, the identifiers and assigned priority values from the control plane to the data plane, and the identifiers in order and assigned priority values from the control plane to the data plane.

13. The non-transitory, machine-readable medium of claim 9, wherein the previously assigned priority values were previously assigned according to a set of rules that specify relative priority assignments for application precedence.

14. The non-transitory, machine-readable medium of claim 13, wherein the set of rules specify at least one of: a child application being assigned a higher priority than a parent application, a tunnel application being assigned a higher priority than a container application, a custom application being assigned a higher priority than a system application, a layer 7 protocol based application being assigned a higher priority than an application identified by an application-specific signature, and an application identified by port being assigned a lower priority than applications identified by other than port.

15. The non-transitory, machine-readable medium of claim 9, wherein the program code further comprises instructions to receive definitions of applications that include application identifiers and assignments of priority values to the application identifiers, wherein the instructions to determine the previously assigned priority values comprise instructions to determine the previously assigned priority values from the assignments of priority values to the application identifiers.

16. A system comprising:
a control plane comprising a first machine-readable medium having instructions stored thereon that are executable to cause the control plane to,
inspect a first flow of network traffic to identify applications indicated in the network traffic;
for each of a plurality of applications identified based on inspection, determine one of a plurality of priority values previously assigned to the identified application;
a data plane comprising a second machine-readable medium having instructions stored thereon that are executable to cause the data plane to,
select policies based, at least in part, on identifiers of the plurality of applications; and enforce the selected policies on network traffic corresponding to the flow according to precedence as represented by the determined priority values.

17. The system of claim 16, wherein at least one of the first machine-readable medium and the second machine-readable medium further stored thereon instructions to order identifiers of the plurality of applications according to the priority values, wherein the precedence is indicated by the ordering.

18. The system of claim 16, wherein the second machine-readable medium further has stored thereon instructions executable to cause the data plane to:

mirror network traffic to the control plane;

inspect the flow for application identification; and based on identification of an additional application, determine a priority value previously assigned to the additional application; and order the identifiers of the plurality of applications and the additional application based on the assigned priority values.

19. The system of claim 16, wherein the first machine-readable medium further has stored thereon instructions executable to cause the control plane to receive definitions of applications that include application identifiers and assignments of priority values to the application identifiers, wherein the instructions to determine the previously assigned priority values comprise instructions to determine the previously assigned priority values from the assignments of priority values to the application identifiers.

20. The system of claim 19 further comprising a network controller programmed to communicate the definitions of applications and to communicate updates to the definitions of applications to a plurality of network devices, wherein a first of the network devices comprises the control plane and the data plane.

* * * * *